United States Patent [19]

DeLapp

[11] 4,094,846
[45] June 13, 1978

[54] LOW PRESSURE MELAMINE RESINS CONTAINING ELASTOMERS

[75] Inventor: Darwin Fiske DeLapp, New Canaan, Conn.

[73] Assignee: Formica Corporation, Cincinnati, Ohio

[21] Appl. No.: 767,720

[22] Filed: Feb. 11, 1977

[51] Int. Cl.² ............................................. C08L 61/28
[52] U.S. Cl. ..................... 260/29.4 R; 260/29.2 TN; 260/29.4 UA; 260/856; 428/425; 428/503; 428/530
[58] Field of Search ............... 260/29.4 R, 29.4 UA, 260/67.6 R, 849, 856, 852, 29.2 TN; 428/425, 503, 530

[56] References Cited

U.S. PATENT DOCUMENTS

| | | | |
|---|---|---|---|
| 2,796,362 | 6/1957 | Wooding et al. | 260/29.4 UA |
| 2,952,564 | 9/1960 | Traverso | 260/29.4 UA |
| 2,976,167 | 3/1961 | Maeder et al. | 260/29.4 UA |
| 3,428,582 | 2/1969 | Deex | 260/897 C |
| 3,479,310 | 11/1969 | Dieterich et al. | 260/29.2 |
| 3,715,172 | 2/1973 | Dembowski | 260/852 |
| 3,843,580 | 10/1974 | Andersen | 260/29.6 TA |
| 3,925,287 | 12/1975 | Andersen | 260/29.4 UA |

FOREIGN PATENT DOCUMENTS 1,417,421   12/1975   United Kingdom.

*Primary Examiner*—Theodore E. Pertilla
*Attorney, Agent, or Firm*—Frank M. Van Riet

[57] ABSTRACT

A composition of matter comprising a mixture of a melamine/formaldehyde resin, an elastomer comprising an ethylene/vinyl chloride copolymer containing amide groups, a butadiene/acrylonitrile copolymer containing carboxyl groups or a polyurethane resin containing carboxyl groups and an alkylene polyamine, is disclosed.

10 Claims, No Drawings

LOW PRESSURE MELAMINE RESINS CONTAINING ELASTOMERS

BACKGROUND OF THE INVENTION

The production of decorative surfaced panels designed for such applications as furniture and vertical surfaces where exceptionally high abrasion resistance is not required has increased enormously over the past decade. These panels comprise a single sheet of melamine/formaldehyde resin impregnated decorative paper which is bonded under heat and pressure to a substrate, usually particleboard, of about one-quarter to about one inch in thickness. These products, because they are produced at low pressures, i.e., about 300 psi, and at very short cure cycles, i.e., 2–3 minutes, are relatively inexpensive and have a good appearance and stain resistance.

Abrasion resistance thereof is, however, often poor and attempts have been made to improve the property by providing a layer of clear, unfilled melamine/formaldehyde resin on top of the decorative sheet. While these panels have proven very successful in that the abrasion resistance is adequately elevated, they deteriorate when subjected to humidity conditions encountered in normal use.

This deterioration manifests itself as surface cracks in the panel after it is subjected to low humidity. The cracks are believed to be a result of the dimensional instability of the melamine/formaldehyde resin. These resins undergo dimensional changes owing (1) to loss of water during curing, (2) to cooling after release from the panel press and (3) to loss or gain of water during subsequent exposure to the environment. The dimensional changes are often enough to strain the resin to failure, thus forming cracks. The decorative cellulosic sheet aids in the resistance of the panel to cracking, but its effectiveness is limited by the need for a resin-rich surface to impart abrasion resistance.

Known additives which generally have been added to melamine/formaldehyde resins (such as sucrose, dipentaerythritol sebacate etc.) so as to react with the resin and reduce the tightness of cross-linking usually associated with brittleness do not prevent cracking to a satisfactory degree.

In application Ser. No. 767,721, filed of even date herewith by Huffman, Casey and Thomas, there is described a melamine/formaldehyde resin formulation which can be carried as a transparent film on top of a decorative print sheet in decorative panels to thereby confer abrasion resistance thereto, which will not crack when the panel is subjected to low humidity and will still retain the desirable properties of melamine/formaldehyde resins per se, including transparency and resistance to heat and staining.

The formulation of said application comprises a mixture of a melamine/formaldehyde resin and an ethylene/vinyl chloride copolymer containing amide groups or a polyether based, polyurethane resin containing carboxyl groups. Although this formulation, when impregnated into a fibrous sheet and used to produce a decorative panel, solves the problem of craze and crack formation in the panel at low humidity, it possesses one disadvantage which is especially undesirable in panels which have an intricate printed decorative design on the top surface thereof. The disadvantage manifests itself as a haze in the surface which is not unattractive when solidly colored panels are produced but presents serious aesthetic problems when wood grain or other complex designs are used.

SUMMARY OF THE INVENTION

I have now found that the propensity of the melamine/formaldehyde resin-elastomer blends for producing a hazy coating can be materially reduced, if not obviated, by incorporating an alkylene polyamine into the resin-elastomer mixture. Not only does the use of the alkylene polyamine solve the problem of haze formation, but it also enables one to materially reduce the amount of, or eliminate altogether, the curing catalyst used to β-stage the resin-elastomer blend once it is impregnated into the cellulosic decorative sheet. This result is truly unexpected because polyamines of this class have not previously been used in this type of resin formulation.

DESCRIPTION OF THE INVENTION INCLUDING PREFERRED EMBODIMENTS

As mentioned briefly above, I have now discovered a novel composition of matter comprising a mixture of
(1) a melamine/formaldehyde resin syrup,
(2) an elastomer comprising
 (a) an ethylene/vinyl chloride copolymer containing amide groups,
 (b) a polyurethane resin containing carboxyl groups, or
 (c) a butadiene/acrylonitrile copolymer containing carboxyl groups and
(3) an alkylene polyamine.

The melamine/formaldehyde resin syrups useful herein are well known to those skilled in the art. They are generally prepared by adding water, melamine crystal, formaldehyde, usually used as a 37% solution in water, and other additives in minor amounts, to water in mole ratio of melamine to formaldehyde of from about 1 : 1.6 to about 1 : 2.5 and allowing the reaction to proceed at about 75°–90° C. for 5–12 hours. Sufficient material is added to produce a resin solids content of from about 40% to about 75%, preferably from about 50% to about 65%, in the resultant aqueous solution.

The elastomer component of the compositions is generally added to the melamine/formaldehyde resin in such a quantity so as to result in a solids content of the elastomer of from about 2.5% to about 30.0%, preferably from about 5.0% to about 25.0%, by weight, based on the total weight of the melamine/formaldehyde resin solids.

The elastomer is preferably added to the melamine/formaldehyde resin solution as small particles and usually in latex form. The particle size in most instances should not exceed about 4,000 A; however, it is possible, in some cases, to utilize elastomers having a particle size, on the average, of up to about 20,000 A. Where it is required that the compositions produce a transparent system, e.g., in the production of decorative panels of a specific color or having a specific decorative pattern or design on the decorative layer, haze production can be decreased if the elastomeric additive has a particle size of less than about 1,000 Angstroms. Alternatively, haziness can be reduced, i.e., tranparency can be enhanced by matching the refractive index of the elastomer to that of the melamine/formaldehyde resin. The combination of a particle size less than about 1,000 Angstroms and a matching refractive index will, of course, further enhance the usefulness of the elastomer.

Examples of elastomeric materials which may be used include the ethylene/vinyl chloride polymers having available reactive amide groups. These copolymers are well known in the art and contain from about 20% to about 30% ethylene, from about 65% to about 80% vinyl chloride and from about 0.5% to about 7%, preferably from about 1.0% to about 5.0% amide groups, said percentages totaling 100% and being, by weight, based on the total weight of the elastomer. The amide functionality can be imparted to the ethylene/vinyl chloride copolymer in any manner known to those skilled in the art such as by copolymerization thereof with amide containing vinyl monomer e.g., acrylamide, methacrylamide and the like, see U.S. Pat. No. 3,428,582 incorporated herein by reference.

The polyurethane elastomers useful herein are governed only by their ability to either dissolve in water or to form a latex. That is to say, if the polyurethane elastomer is per se water-soluble, it can be added as such to the aqueous melamine/formaldehyde resin solution and produce a composition which may be used to prepare a useful laminate. Alternatively, if the polyurethane elastomer is capable of being formed into a latex, the latex can be added to the aqueous melamine/formaldehyde resin solution and the elastomer will, of course, remain dispersed therein. The resultant dispersion can then be used to impregnate a decorative sheet and form a decorative panel.

The polyurethane resin can therefore be produced by reacting such polyols as those having a molecular weight of from about 400 to about 5,000, preferably from about 600 to about 3,000, with an isocyanate. Useful polyols include those produced from diols such as the polyoxyalkylene adducts of diols and alkylene oxides such as ethylene oxide, propylene oxide, butylene oxide, mixtures thereof and the like. Useful diols include ethylene glycol, 1,2-propylene glycol, 1,3-propylene glycol, 1,2-butanediol, 1,4-butanediol, 1,6-hexanediol, hydroquinone, bisphenol A and the like.

Typical polyoxyalkylene diols include polyethyleneether glycol, polypropyleneether glycol, polytetramethylene-ether glycol and the like.

Polyoxyalkylene arylene diols which also have molecular weights ranging from about 400 to about 5,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters constitute another class of reactive organic diols which may be employed in preparing urethane prepolymers used in the present invention. While the preparation of polyesters suitable for this purpose has been described in great detail in the prior art and forms no part of the present invention per se, it may be mentioned here by way of illustration that polyesters of this type may be prepared by the condensation of a dihydric alcohol, generally a saturated aliphatic diol such as ethylene glycol, propanediol-1,2, propanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic succinic, glutaric, adipic, pimelic, suberic, azelaic, terephthalic, sebacic, malic, phthalic, cylohexanedicarboxylic and endomethylenetetrahydrophthalic acid, and the like, and their isomers, homologs, and other substituted derivatives, e.g., chloro derivatives. The linear polyesters used in preparing the urethane prepolymers also have molecular weights ranging from about 400 to about 5,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 20 to about 300. When preparing these polyesters, an excess of diol over dicarboxylic acid is generally used.

As can be readily appreciated, mixtures of the various reactive organic diols described hereinabove may also be employed in preparing the urethane prepolymers of the present invention.

The organic diisocyanates which can be employed to produce the urethane used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis(cyclohexyl isocyanate), 4-chloro-m-phenylene diisocyanate, isophorone diisocyanate, o, p, or m-phenylene diisocyanate, trimethylhexamethylene diisocyanate, 4-t-butyl-m-phenylene diisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, 3,3'-dimethoxy-4,4'-biphenylene diisocyanate, mixtures thereof and the like.

The polyol may be reacted with the diisocyanate in the presence of a suitable catalyst such as an organotin compound, e.g., dibutyltin dilaurate, dibutyltin octoate and the like; a tertiary amine, e.g., triethylene diamine; an organolead compound, e.g., lead octoate and the like, at concentrations of from about 0.001 to about 0.1%, by weight, based on the total weight of the polyol and diisocyanate. The reaction is allowed to proceed at a temperature of from about 60° to about 180° C. until the isocyanate terminated urethane prepolymer forms, i.e., from about 4 to about 24 hours.

As mentioned above, in order for the polyurethane elastomer to be useful herein, it must contain carboxyl groups. These carboxyl groups, present in the elastomer in a concentration of about 3.0% to 10.0%, by weight, based on the total weight of the elastomer, can be incorporated into the elastomer by any known procedure such as by replacing an equivalent amount of the above-mentioned polyol with a polyol containing at least one carboxyl group. Suitable compounds conforming to this description are 2,2-dimethylol propionic acid, tartaric acid, glyceric acid, bis(hydroxymethyl)benzoic acid, bis(hydroxymethyl)cyclohexane carboxylic acid and the like. U.S. Pat. No. 3,479,310, also incorporated herein by reference, teaches the production of such carboxyl containing polyurethanes.

A third series of elastomers useful herein comprises the butadiene/acrylonitrile copolymers containing available carboxyl groups. These elastomers are well known in the art as represented by British Application No. 16737/72 (Provisional Specification) filed Apr. 11, 1972 and generally comprise from about 50-95% of butadiene and, correspondingly, from about 5-50% of acrylonitrile. Carboxylation of the copolymer in amounts ranging from about 1-10% can be achieved by replacing a portion of either of the comonomers with a carboxyl group containing monomer or carboxylating the copolymer, as is known in the art.

The novel compositions of the instant invention are then prepared by blending the elastomer per se or after having emulsified it with a suitable amine such as triethanol amine, N-methyl morpholine, tetramethyl ammonium hydroxide, triethylamine, tetrabutylammonium hydroxide, and the like, with the aqueous melamine/formaldehyde resin solution, with stirring for from about 3-15 minutes. Catalyst, such as ammonium sulfate, thiourea, hydrochloric acid, sulfuric acid, formic acid, acetic acid, oxalic acid, sodium hydroxide, potassium hydroxide, sodium carbonate and the like, can be added at this time to regulate subsequent cure rate of the melamine/formaldehyde resin when the decorative sheet containing it is heat and pressure consolidated into the decorative panel but the use of such a catalyst is not required and, in fact, is not preferred because I have found that the alkylene polyamine performs the same function.

The alkylene polyamine can be added to my novel compositions before or after the melamine/formaldehyde resin and elastomer have been blended or it can be added to either the elastomer or the resin and then the remaining component can be added, the particular method of blending the ingredients forming no part of the instant invention.

The alkylene polyamines employed herein have the general formula

$H_2N[CH_2CH_2NH]_nCH_2CH_2NH_2$ wherein $n$ is a whole, positive integer of 0-3, inclusive. Examples of useful polyamines include ethylene diamine, diethylenetriamine, triethylene tetramine and tetraethylene pentamine. The polyamines are incorporated into the formulations in amounts ranging from about 0.25 to about 1.25%, by weight, based on the total solids, i.e., the melamine/formaldehyde resin and the elastomer, of the composition.

The aqueous melamine/formaldehyde resin solution can be used as such or the resin itself and/or the solution, often times called a "syrup", may be further modified by the addition of known additives thereto.

The blending of the prepared elastomer with the melamine/formaldehyde resin solution and alkylene polyamine is the preferred manner in which the novel compositions of my invention may be prepared. It is also possible, however, to form the elastomer in situ in the melamine/formaldehyde solution containing the alkylene polyamine by incorporating therein a solution of the elastomer components and then forming the elastomer during the melamine/formaldehyde precuring operation and/or the decorative panel production.

The resultant composition is then used to impregnate a cellulosic decorative sheet in a manner known in the art. The composition, once impregnated, is then precured by heating at 80°-125° C. for 3-50 minutes, shorter times requiring higher temperatures and vice versa. The impregnated paper should contain at least about 40% resin, by weight, based on the total weight of the resin-impregnated sheet.

A decorative panel is then prepared from the B-staged decorative sheet by forming a stack in superimposed relationship of a steel plate, a ¼"-1" particleboard sheet, the B-staged decorative sheet, a release sheet and a second steel plate. The stack is placed in a press, heated to at least about a 130° C. platen temperature and at least 200 psi pressure is applied for about 15 seconds to about 12 minutes. The resultant panel is recovered by merely opening the press and removing the release sheet.

The following examples are set forth for purposes of illustration only and are not to be construed as limitations on the present invention except as set forth in the appended claims. All parts and percentages are by weight unless otherwise specified.

The Taber abrasion Resistance Test mentioned below is specifically detailed in N.E.M.A. Standards Publication "Laminated Thermosetting Decorative Sheets", Standard #LD1-2,01 "Method of Test of Resistance of Surface to Wear".

EXAMPLE A

Preparation of a Polyurethane Emulsion

To a suitable reaction vessel equipped with stirrer, thermometer, $N_2$ gas inlet and vacuum adapter are added 44.2 parts of polytetramethylene glycol having a molecular weight of 2,000 and 11.9 parts of 2,2-bis(hydroxymethyl)propionic acid. The vessel is heated to 100° C. and a 1-2 mm Hg pressure for 2 hours to dry the glycol and acid. A blanket of nitrogen gas is then maintained over the vessel contents and the vessel is cooled to 40° C. 43.9 Parts of toluene diisocyanate are then added and the exotherm is controlled at 80° C. for 8 hours. The vessel is then cooled to 60° C. and the resultant polyurethane polymer is transferred to a second vessel and sealed under nitrogen.

To a third vessel are added 7.0 parts of triethanol amine, as an emulsifier, in 90 parts of water. The vessel is cooled to 4° C. The cooled solution is transferred to a fourth vessel which has been cooled to 0° C. and is equipped with vigorous agitation means. The solution is vigorously agitated and 30.0 parts of the above-prepared polyurethane polymer is heated to 100° C. and added to the vortex of the agitating solution in a continuous stream. When addition is complete, 10.0 parts of chipped ice are added and stirring is continued 1 minute. Another 10.0 parts of chipped ice are added and the media is again agitated for 1 minute. The vessel contents are then transferred to a suitable container, cooled to <10° C. and stirred for 5 hours while the temperature slowly rises to ambient. A clear, blue opalescent emulsion of 25% solids is recovered. Small amounts of coagulum which may be present therein are removed by filtering the emulsion through a No. 1 Whatman paper. The average particle size of the elastomer is less than 1,000 Angstroms.

EXAMPLE 1

100 Parts of a commercially available 1 : 1.8 melamine/formaldehyde resin syrup (58% solids) are added to a suitable reaction vessel. The liquid is stirred and 1.0 part of tetraethylene pentamine is added thereto. To the resultant mixture are then added 34.8 parts of the polyurethane emulsion of Example A. Stirring is continued for 5 minutes. A stable emulsion is recovered.

A large section of woodgrained print paper is impregnated with the resultant stable emulsion. The impregnated sheet is precured in an air circulating oven. The precured paper sheet is then placed atop a particleboard section of the same size with the decorative side up and a release sheet is placed on top of the decorative side thereof. The assembly is placed between 2 steel press plates, slid into a hydraulic press heated to a platen temperature of about 155° C. and pressed at 250-350 psi for 2-3 minutes. The resulting surface layer of polyurethane modified resin is transparent and about 45μ thick. The panel is removed from the press and tested.

The low humidity cracking resistance thereof is determined by placing the decorative panel into an indicating $CaSO_4$ conditioned desiccator at 0% R.H. and counting microcracks formed at intervals during 30 days through a stereomicroscope.

Abrasion resistance is determined as set forth above. The Taber cycles to 50% print erasure are 210. Only 10 microcracks appear after 30 days. No haze is visible to the naked eye, whereas, without the pentamine, a slight haze is detectable.

EXAMPLES 2 – 7

Following the procedure of Example 1, additional decorative panels are prepared. The percentage of the pentamine is varied as is the percentage of the polyurethane and the precuring cycle. The results are set forth in Table I, below. In each case, the decor sheet was clearly visible as a sharp, contrasting pattern.

TABLE I

| Ex. | % Polyurethane | % Pentamine | Taber Cycles to 50% Print Erasure | No Cracks after days at 0% R.H. |
|---|---|---|---|---|
| 2 | 8.1 | 1.0 | 300 | 7 – 30 days |
| 3 | 8.1 | 0.2 | 310 | 0 – 28 days |
| 4 | 8.1 | 0.4 | 170 | 0 – 28 days |
| 5 | 8.1 | 0.4 | 300 | 0 – 28 days |
| 6 | 8.1 | 0.6 | 280 | 0 – 28 days |
| 7 | 8.2 | 0.6 | 240 | 0 – 28 days |

* = $(NH_4)_2SO_4$ added as cat.

EXAMPLE 8

Again following the procedure of Example 1 except that 10% of a commercially available ethylene/vinyl chloride (18/77) copolymer containing 5% amide functionality is used instead of the polyurethane, a smooth, clear film results on the decorative panel. The average particle size of the copolymer is about 775 A. Precuring followed by laminating as described in Example 1 results in panels having a Taber value of 140-170. No cracks are observed after 40 days at 0% R.H. The decorative pattern is clearly visible to the naked eye.

EXAMPLE 9

The procedure of Example 1 is again followed except that a commercially available poly(ethylene adipate) of 1700 molecular weight and having terminal hydroxyl groups is used as the polyol. Similar results are achieved, the polyurethane elastomer having been added to the melamine/formaldehyde resin solution by suspending it in the aqueous phase thereof. Particle size of the urethane is about 1,000 Angstroms. Again the decor is visible to the naked eye.

EXAMPLE 10

A bisphenol A-ethylene oxide adduct of 2,800 molecular weight is used as the polyol in place of that of Example 8. Again an excellent decorative panel with no cracks after 35 days at 0% R.H. is produced. The particle size of the polyurethane is about 1,500 Angstroms. Clarity is excellent.

EXAMPLE 11

The procedure of Example 1 is again followed except that the particle size of the elastomer in the emulsion is about 3,200 Angstroms and a blue decorative sheet is used. A panel having excellent crack resistance at 0% R.H. and a clear blue sparkling surface is produced.

EXAMPLE 12

The procedure of Example 1 is again followed except that the polyurethane is replaced by 21% of a commercially available butadiene/acrylonitrile (80/20) copolymer containing 3.5% carboxyl groups and a white decor sheet is used. A sharp, bright decorative panel is recovered which exhibits excellent crack resistance at low humidity and possesses no haze visible to the naked eye.

EXAMPLES 13–15

When the tetraethylene pentamine of Example 1 is replaced by an equivalent amount of (13) ethylene diamine, (14) diethylene triamine and (15) triethylene tetramine, substantially identical results are achieved.

EXAMPLES 16–17

When the procedure of Example 10 is again followed except that (16) ethylenediamine and (17) triethylene tetramine are substituted for the tetraethylene pentamine thereof, the results are again substantially equivalent.

EXAMPLE 18

The use of diethylenetriamine in Example 12 as a replacement for the tetraethylene pentamine thereof achieves identical results.

I claim:
1. A composition of matter comprising a mixture of
   (1) an aqueous melamine/formaldehyde resin solution wherein the melamine to formaldehyde ratio thereof ranges from about 1:1.6 to about 1:2.5,
   (2) from about 2.5% to about 30.0%, by weight, based on the weight of the resin solids of (1), of an elastomer comprising
      (a) an ethylene vinyl chloride copolymer containing from about 20% to about 30% ethylene, from about 65% to about 80% vinyl chloride and from about 0.5% to about 7.0%, by weight, said percentages being based on the total weight of (a), of amide groups,
      (b) a polyurethane resin containing from about 3.0% to about 10.0%, by weight, based on the total weight of (b), of carboxyl groups, or
      (c) a butadiene/acrylonitrile polymer containing from about 50% to about 95% butadiene, from about 5% to about 50% acrylonitrile and from about 1% to about 10%, by weight, said percentages being based on the total weight of (c), of carboxyl groups, said elastomer having a particle size of up to about 20,000 Angstroms, and
   (3) from about 0.25 to about 1.25%, by weight, based on the total weight of solids in said composition, of an alkylene polyamine having the formula

$$H_2N[CH_2CH_2NH]_nCH_2CH_2NH_2$$

wherein $n$ is a whole, positive integer of 0–3, inclusive.

2. A composition of matter according to claim 1 wherein the percentage of said (2) ranges from about 5.0% to about 25.0%, by weight, same basis.

3. A composition of matter according to claim 1 wherein said elastomer has a particle size of up to about 4,000 Angstroms.

4. A composition of matter according to claim 1 wherein said elastomer has a particle size of up to about 1,000 Angstroms.

5. A composition of matter according to claim 1 wherein said elastomer is (a).

6. A composition of matter according to claim 1 wherein said elastomer is (b).

7. A composition of matter according to claim 1 wherein said (3) is tetraethylene pentamine.

8. A composition of matter according to claim 1 wherein said (3) is triethylene tetramine.

9. A composition of matter according to claim 1 wherein said elastomer is (c).

10. A method for the production of the composition of claim 1 which comprises
(I) forming an aqueous solution of a melamine/formaldehyde resin wherein the melamine to formaldehyde ratio thereof ranges from about 1:1.6 to about 1:2.5, and from about 0.25 to about 1.25%, by weight, based on the total weight of solids in said composition, of an alkylene polyamine having the formula $$H_2N[CH_2CH_2NH]_nCH_2CH_2NH_2$$

wherein $n$ is a whole, positive integer of 0–3, inclusive,
(II) forming an aqueous emulsion of
(A) an ethylene/vinyl chloride copolymer containing from about 20% to about 30% ethylene, from about 65% to about 80% vinyl chloride and from about 0.5% to about 7.0%, by weight, said percentages being based on the total weight of (A), of amide groups,
(B) a polyurethane resin containing from about 3.0% to about 10.0%, by weight, based on the total weight of (B), of carboxyl groups or
(C) a butadiene/acrylonitrile copolymer containing from about 50% to about 95% butadiene, from about 5% to about 50% acrylonitrile and from about 1% to about 10%, by weight, said percentages being based on the total weight of (C), of carboxyl groups,
(III) blending said (I) with from about 2.5% to about 30.0%, by weight, based on the weight of the resin solids of (I), of said (II) with stirring and
(IV) recovering the resultant emulsion.

* * * * *